Figure 1:
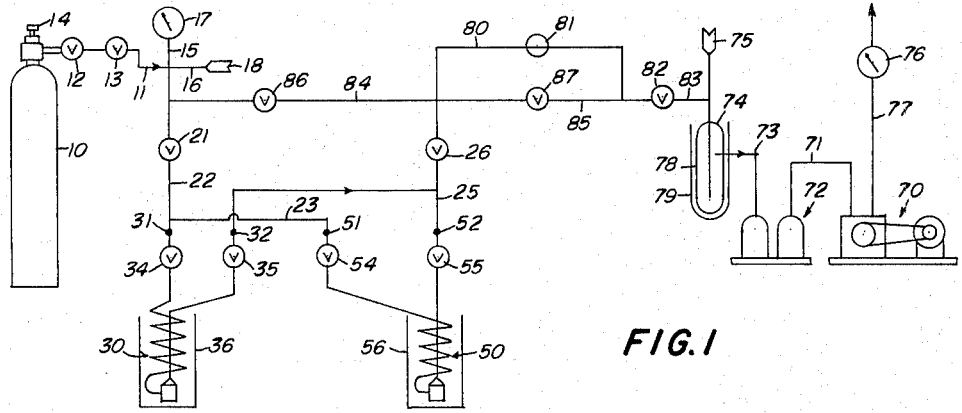

July 13, 1965

W. M. DEATON ETAL 3,194,054

APPARATUS FOR CONCENTRATING TRACE IMPURITIES
IN HIGH-PURITY HELIUM

Filed Aug. 7, 1961

INVENTORS
WILLIAM M. DEATON
CALVIN G. KIRKLAND

BY Ernest S. Cohen
Gersten Sadowsky
ATTORNEYS

United States Patent Office 3,194,054
Patented July 13, 1965

3,194,054
APPARATUS FOR CONCENTRATING TRACE IMPURITIES IN HIGH-PURITY HELIUM
William M. Deaton and Calvin G. Kirkland, both of Amarillo, Tex., assignors to the United States of America as represented by the Secretary of the Interior
Filed Aug. 7, 1961, Ser. No. 129,909
12 Claims. (Cl. 73—25)
(Granted under Title 35, U.S. Code (1952), sec. 266)

The invention herein described and claimed may be manufactured and used by or for the Government of the United States of America for governmental purposes without the payment of royalties thereon or therefor.

The invention relates to improvements in an analyzing apparatus and method for testing samples of highly purified helium gas by concentrating trace impurities contained in this helium to a degree that will permit analysis of the impurities by a mass spectrometer or other conventional means of analysis.

Increasing demand for helium containing less than 50 parts per million (p.p.m.) total impurities for missile and atomic energy applications has created an imperative need for reliable analytical determinations of the trace impurities in even the purest form of helium now available, such as that generally designated Grade-A helium. It is desirable thta the impurities be identified and their concentration level be established with a sensitivity of approximately one part per million for each contaminant present. An urgent need has been recognized for establishing specifications on the purity of helium, and a suitable analytical method, and equipment applicable to such method, are required before such specifications can be written.

Analytical methods that have been used in the past, to determine the impurity content of Grade-A helium, include (1) direct analysis by mass spectrometer, employing highest sensitivity and pressure; (2) observing and interpreting the quality of aluminum welds made by the heliarc method; (3) analysis by thermal conductivity methods; and (4) analysis by means of the Deoxo super-sensitive indicator. The inadequacies of these methods become apparent in light of the high degree of accuracy presently desired from any such analysis. The sensitivity of the mass spectrometer is limited to about 25 p.p.m., since any impurity present in a quantity less than 25 p.p.m. is observed as only a trace. By judging the quality of aluminum welds prepared by the heliarc method, impurity concentrations of oxygen, nitrogen and water vapor of about 50 p.p.m. in the helium can be determined qualitatively. This method, however, cannot detect neon (a major impurity), and argon. Thermal conductivity cells are used to analyze for hyrogen and nitrogen in helium. Hydrogen increases the thermal conductivity and nitrogen decreases it. Since both of these gases are known possible contaminants in Grade-A helium, thermal conductivity methods when used alone, give uncertain results. The Deoxo super-sensitive indicator analyzes only for hydrogen and oxygen. Since these are not major contaminants in Grade-A helium, the Deoxo method is poorly adapted to the helium trace impurity problem.

An object of the present invention is therefore to allow a highly accurate determination of the trace impurities in Grade-A helium by providing a method and apparatus by means of which trace impurities contained in a sample of the Grade-A helium are concentrated for separation from the sample.

Another object of the present invention is to provide an apparatus in which trace impurities in a sample of helium are concentrated by freezing them out from the sample, in a trap cooled by liquid helium.

A further object of the present invention is to make available a method for analyzing qualitatively and quantitatively, the various contaminants contained in a sample of Grade-A helium.

Figure 2:
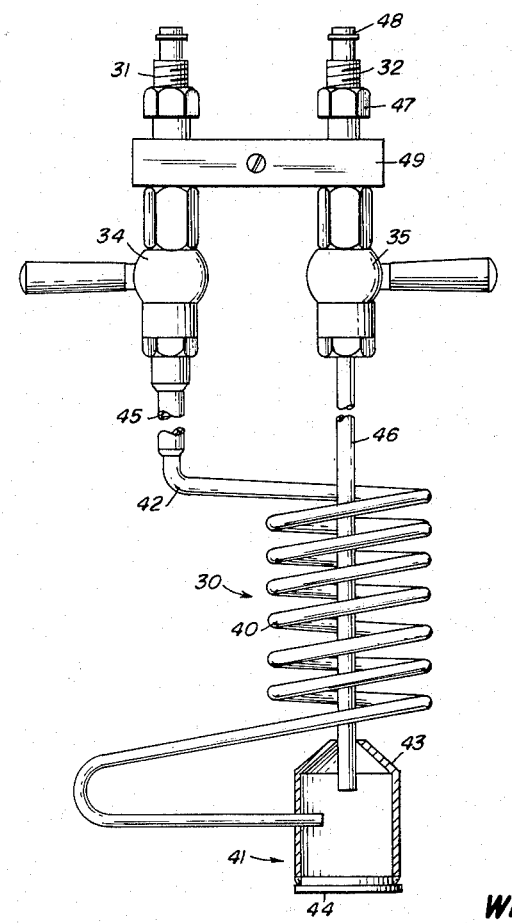

These and other objects and advantages of the invention will be more clearly understood from the following description of a preferred embodiment of the invention, considered together with the accompanying drawing wherein:

FIG. 1 is a schematic diagram showing an over-all arrangement of equipment for the present invention, and illustrating the paths of the gas flow within the arrangement; and FIG. 2 is a showing, partly in section, of apparatus incluindg means wherein the helium contaminants are concentrated for collection.

According to the present invention there is made possible a precise analysis of a sample of helium from a source such as a tank or similar storage facility, whereby are determined percentages of the sample constituting its gaseous contaminants. A preferred procedure for making this analysis is initiated by evacuating, purging and testing for gas leaks, a means for receiving the sample of helium in a controlled flow from the source, and for conducting this sample of helium through enclosed paths in an environment defined by particularly predetermined pressure and temperature conditions. To carry forward this procedure, there is applied to the outer surface of a relatively small gas trapping enclosure vessel having an inlet and outlet, and providing in part the path through which the helium sample is conducted, a supply of liquid nitrogen to precool the vessel. This outer surface is then surrounded with a Dewar flask containing liquid helium at atmospheric pressure. The sample of helium to be analyzed in thereafter supplied from the source as a gaseous flow of one-quarter to one-half cubic feet, over a period of about eight minutes, to be conducted through the aforesaid paths maintained at a vacuum 10 inches of mercury. When the supply is cut off at the source, the helium within the paths is subjected to a vacuum pumping to 1.0 micron or less, and the total volume of helium evacuated thereby, is measured. Following this, the gas trapping vessel is isolated by sealing it at its inlet and outlet, from the remaining paths. It is evident that all materals of the sample passing through the vessel except pure helium are frozen solid since they are subjected to the temperature of the normal boiling point of liquid helium. Assurance that all of the sample of helium passing through the vessel achieves this temperature in the vessel, is had by the accurate control of the rate of flow of the sample, and the maintenance of a prdetermined vacuum pressure in the enclosed paths. The liquid helium is then removed from the vessel's outer surface, and for a duration of time of at least 30 minutes the vessel is warmed to room temperature such that its initially solid contents constituting the concentrated sample of frozen gaseous contaminants of the helium sample, become uniformly mixed. The contents of the trapping vessel, which are now in gaseous form, are subsequently directed to enter a mass spectrometer wherein the measurements observed provide the data to complete the analysis.

The pressure of the vaporized impurities and any residual helium in the vessel is determined by means of a calibrated micromanometer located in the mass spectrometer. By introducing known pressure in a trapping vessel and then attaching it to the mass spectrometer inlet, a reading on the micromanometer is obtained. From a plot of such data, the pressure existing in the enclosure after a run is determined from the micromanometer reading obtained when the sample of impurities is entered into the mass spectrometer for analysis. The volume of the vessel is also determined, such as by comparison with a known or standard volume previously calibrated with mercury. The mole percent of each component in the concentrated impurity sample may then be calculated from the mass spectrometer data. For a more detailed explanation of the mass spectrometer and the aforemention data determinations and calculations related thereto, reference should be made to the ASTM Standards on Gaseous Fuels, ASTM Committee D-3, Method D 1137–53, September 1958, pages 110 to 120.

The calculation of the trace impurity percentage is depedent upon the degree of concentration (concentration ratio) occurring during each run. Assuming the temperature to be constant, this ratio can be determined by measurements of volume and pressure.

A material balance may be written as follows:

$$PV = P_t V_t + P_{He} V_{He} \quad (1)$$

in which $P$ = the pressure of the sample of Grade-A helium,
$V$ = the total volume of Grade-A helium entered into the apparatus,
$P_t$ = trap pressure,
$V_t$ = trap volume,
$P_{He}$ = pressure of purified helium leaving the apparatus (at wet-test meter conditions—equal to barometric pressure at time of run), and
$V_{He}$ = volume of purified helium leaving the apparatus (measured by wet-test meter, with appropriate corrections).

The traps contain a fraction of residual helium (designated $He_t$) in addition to the impurities; thus, we may write:

$$P_t V_t = P_i V_i + P_t V_t He_t \quad (2)$$

where $P_i$ = pressure of concentrated impurities contained in the trap, and $V_i$ = volume of concentrated impurities in the trap.

Substituting Equation 2 into (1) we obtain $$PV = P_i V_i + P_t V_t He_t + P_{He} V_{He} \quad (3)$$

In the experimental method $P_t$, $V_t$, $P_{He}$ and $V_{He}$ are directly measured. The concentration factor is equal to $PV$, the product for the *total* sample of Grade-A helium passed through the apparatus, divided by $P_i V_i$, thus:

$$\text{Concentration factor} = \frac{PV}{P_i V_i} \quad (4)$$

Solving (2) for $P_i V_i$ and substituting into Equations 3 and 4, and substituting $PV$ from Equation 3 into (4) we obtain Concentration factor (C.F.) =

$$\frac{P_t V_t - P_t V_t He_t + P_t V_t He_t + P_{He} V_{He}}{P_t V_t - P_t V_t He_t} =$$

$$\frac{P_t V_t + P_{He} V_{He}}{P_t V_t - P_t V_t He_t} \quad (5)$$

$$\text{Total impurity (p.p.m.)} = \frac{10^6}{C.F.} \quad (6)$$

Substituting Equation 5 into (6), $$\text{Total impurity (p.p.m.)} = 10^6 \left[ \frac{P_t V_t - P_t V_t He_t}{P_t V_t + P_{He} V_{He}} \right] \quad (7)$$

Because, in actual practice, $P_{He} V_{He} \gg P_t V_t$, Equation 7 may be simplified to:

$$\text{Total impurity (p.p.m.)} = 10^6 \left[ \frac{P_t V_t - P_t V_t He_t}{P_{He} V_{He}} \right] \quad (8)$$

A typical run gives the following data:

$P_t = 19.03$ mm. Hg. $\quad V_t = 9.34$ cm.$^3$
$He_t = 0.17$
$P_{He} = 670.2$ mm. Hg
$V_{He} = .502$ ft.$^3$ These data are substituted in Equation 8 to give:

Total impurity, p.p.m.

$$= 10^6 \left[ \frac{(19.03)(9.34) - (19.03)(9.34)(.017)}{(670.2)(.502)(28316)} \right] = 18.3$$

This is the total impurity content, independent of the individual contaminants.

Table 1 gives the results of mass spectrometer analysis of the concentrated impurity sample, less the residual helium (1.7 percent) contained in the trap.

*Table 1.—Mass spectrometer analysis of concentrated impurity sample on a helium-free basis*

[Component, mole-percent]

| $H_2$ | $CH_4$ | Ne | $N_2$ | $O_2$ | A | $CO_2$ |
|---|---|---|---|---|---|---|
| 3.5 | 0.0 | 91.4 | 3.7 | 0.7 | 0.0 | 0.7 |

Percentage of each contaminant in the concentrated impurity sample is multiplied by the total parts per million to give the parts per million concentration of each component in the original helium sample. These data, for the above example, are given in Table 2.

*Table 2.—Trace impurity analysis of Grade-A helium*

| Component, p.p.m. (by volume) | | | | | | | Total, p.p.m. $CO_2$ |
|---|---|---|---|---|---|---|---|
| $H_2$ | $CH_4$ | Ne | $N_2$ | $O_2$ | A | $CO_2$ | |
| 0.6 | 0.0 | 16.8 | 0.7 | 0.1 | 0.0 | 0.1 | 18.3 |

An apparatus eminently appropriate for use in carrying out the helium analyzing procedure of the present invention, is shown by the schematic of FIG. 1. Represented by the various symbols in the figure are valves, meters, enclosures, and a vacuum pump system connected together by lines of tubing to form this preferred embodiment of an apparatus according to the present invention. Stainless steel tubing and valves are used wherever possible and all connections are silver-soldered. A good vacuum pump system such as one maintaining a vacuum of $1 \times 10^{-6}$ mm. of mercury is essential for effective operation of the apparatus. A cylinder or container 10, providing a source for the sample of helium to be tested, is connected to an inlet line 11 of the apparatus proper. This connection is completed by way of an adapter valve 12, and an inlet valve 13. To allow a more effective control for the regulation of gas flow than would be possible with only a cylinder valve 14, this adapter 12 comprising a "needle-nose" valve, is used to function as part of the cylinder valve assembly. Before connection is made to the inlet line 11, adapter valve 12 is purged by opening it slightly and then fully opening the cylinder valve. Shortly thereafter, the adapter valve is closed, so that it may be joined to the inlet valve 13, to connect the cylinder 10 to the apparatus.

Extending from inlet line 11, are lines 15 and 16, providing separate connecting passages between the inlet line and a vacuum gage 17 calibrated from 0 to 30 inches, and a Pirani gage 18 having both millimeter and micron scales. Helium arriving from the source 10 through inlet 11, is received in one or the other of two hereinafter to be described trap assemblies 30 and 50, each having inlet and outlet couplings 31, 32, and 51 and 52, respectively. In the line providing the path for the gas flow between the source inlet 11 and the trap assemblies 30, and 50, is a trap inlet valve 21, connected to line 11, and joined to assembly 30 through line 22 and inlet coupling 31, and to assembly 50 through lines 22 and 23, and inlet coupling 51. An additional and more immediate control for the flow of gas passing through trap assemblies 30 and 50, is effected by their inlet and outlet valves 34 and 35, and 54 and 55, respectively. Outlet valves 35 and 55, are connected through their respective couplings 32 and 52, to a gas flow line 25 having in its path a trap exhaust valve 26. Trap assemblies 30 and 50, as seen in FIG. 1, are under operative conditions wherein they are surrounded by Dewar flasks 36 and 56, respectively, each filled with liquid helium. Flasks 36 and 56 are appropriately filled and physically positioned such that the whole of the trap assemblies and about one-third of the gas flow lines extending therefrom to connect the assemblies to the valves 34, 35, 54, 55, are submerged in liquid helium.

A vacuum pumping system for the apparatus includes a mechanical vacuum fore-pump 70, connected by a gas flow line 71 to a water-cooled type oil diffusion pump 72, having its intake line 73 connected to a liquid nitrogen cold trap assembly 74. Assembly 74 comprises an elongated stainless steel, sealed trap container 78, into which are silver-soldered the ends of tubing providing it with an inlet line from the valves of the coil trap arrangement, and an outlet line joining the vacuum pump system intake line 73. Container 78, and short lengths of the tubing extending therefrom, are submerged in liquid nitrogen stored in a conventional Dewar flask 79. The desired sequence of operating pressures in the system is supervised by means of the vacuum gage 17, and two dual range Pirani gages including the gage 18, and a similar gage 75. The volume of helium passed through the system and exhausted from the fore pump 70, is measured on a wet-test meter 76, connected in the exhaust line 77 of the pump.

Helium gas passing out of the trap assembly 30 or 50, and through exhaust valve 26, is conducted in a gas flow line 80 to pass through a fixed orifice 81 consisting of a preset small needle valve, which in cooperation with variable orifice valve 13, is operative to maintain and control a regulated flow rate for the gas under the suction of the vacuum pump system. A terminal exhaust valve 82 is provided in the gas flow line 83 connecting the trap system to the cold trap assembly 74 and the vacuum pump system. To facilitate the purging and testing functions required to prepare the apparatus for operation, there are provided by-pass lines 84, 85, having connected therein a trap by-pass valve 86, and an orifice by-pass valve 87, respectively. Particularly suitable for use as the valves 21, 26, 82, 86, and 87, are V-point needle valves.

Turning now to FIG. 2, there is shown in detail a form of a liquid helium trap assembly applicable for use as parts 30 or 50 in the apparatus of FIG. 1. Since these parts are identical in their construction and operation, a description thereof is made only with reference to trap assembly 30. A freeze-out unit including a coil of tubing 40, and a trap reservoir enclosure 41, is the basic component of the trap assembly. Coil 40 is produced from a length of small diameter stainless steel tubing 42 (such as having a 0.093 inch outside diameter, and a .008 inch wall thickness), wound into seven turns, each being approximately 1.5 inches in diameter. Reservoir 41, is machined from a short length of ⅜ inch stainless steel rod to form a hollow body part 43 having its lower open end sealed with a stainless steeel cap 44 silver-brazed to the body part. A small opening in the cylindrical wall of body part 43, receives therethrough a segment of tubing 42 terminating a curved extension from the last turn of coil 40. Trap inlet valve 34, and outlet valve 35 are connected to cooperate with the freeze-out unit 40, 41, through two straight legs of relatively long lengths of tubing 45, and 46, respectively. This tubing is also finely made, having a 0.120 inch outside diameter, and a 0.013 inch wall thickness. Leg 45 is joined to valve 34 by a conventional cinch coupling, and soldered to the extended part of the first turn coil 40, to complete a passage for the gas from the valve to the coil. One end of leg 46 is extended through an opening in the top of reservoir 41, and the other end is coupled to the outlet valve 35, to complete an exhaust passage for the gas in reservoir 41. Bellows valves, with V-point, would be suitable structure for us as trap valves 34 and 35. Each of the terminal couplings 31 and 32, includes a conventional assembly of a threaded sleeve and a pusher nut 47, and an O-ring type of seal 48, which would allow a vacuum tight connection between the valves and the gas lines 22 and 25 shown in FIG. 1. A clamp 49 secures the parts of the trap assembly in their relative positions, and in place on the housing containing the remainder of the apparatus.

Before the apparatus is actually set to operate for an analysis, careful attention to the cleaning and adjustments of the parts thereof is required to assure satisfactory results. In this high-vacuum apparatus it is essential that the inner walls of the parts be kept clean and free from moisture and high vapor-pressure liquids and solids. If any absorption occurs within the apparatus it is difficult to determine whether the impurities are in the apparatus or the inlet gas. For this reason it is desirable not to use any organic solvents within the apparatus for cleaning. The technique of continuous pumping, purging with helium and alternately gently heating the traps, is used to remove contaminants. When not in use, the apparatus is kept filled to atmospheric pressure with dry helium.

Only one of the trap assemblies 30 and 50, is used in each run. The two trap assemblies are provided to permit impurity concentrations of duplicate samples from each cylinder at a faster rate than would be otherwise possible. To prepare a large number of concentrated samples, it is helpful to have additional coin and trap assemblies, and as many as twelve of these assemblies have been used in the apparatus.

In placing the apparatus in service, the assemblies 30 and 50 are disconected, and valves 13, 21, and 26 are closed, and valves 86, 87, and 82 are opened, and the evacuation of the system is started. When gage 17 indicates a vacuum of the same magnitude as the local barometric pressure, Pirani gages 18 and 75 are turned on and read on their millimeter scales. Liquid nitrogen or liquid air is placed in assembly 74 around the cold trap 78 to assist in a faster pump out. Pirani gages 18 and 75 are then switched to the micron scales, and when the pressure reached is below 1 micron, a check for leaks is made by closing valve 82, and observing Pirani gage 18 for pressure increase. If none occurs, the system is considered operable. Valve 82 is next opened, and the trap assemblies are attached by means of their couplings 31, 32, and 51, 52, making sure that the coil side of each trap is connected to the trap inlet line 22. Valves 21 and 26 and trap valves 34, 35, and 54, 55, are now opened, and the system is once more evacuated to 1 micron; and a second check for leaks is made following the procedure previously described.

Cylinder 10 of the helium to be analyzed is connected to the inlet line 11 through the special adapter valve 12. After the valve 12 is purged and closed, the connection to the inlet line is made. The Pirani gages 18 and 75 are turned off, valve 13 is opened and the system evacuated. Thereafter, the valve 12 is opened slightly to allow a slow purge of helium through the system. Care should be taken that the pressure in the system does not rise more than a few inches above atmospheric pressure, as otherwise the standard taper joints housing the Pirani elements may be blown off. After purging the system for approximately five minutes, inlet valve 13 is closed and the cylinder adapter valve 12 is fully opened.

Valve 86 is next closed, and valve 13 is opened slightly to allow a slow flow through the trap assemblies. To hasten evacuation of the system, the freeze-out units may be heated slightly with a gas flame. Next, the inlet valve 13 is closed and valve 86 is opened. The Pirani gages 18 and 75 are turned on and the system is evacuated to below 1 micron. Then valves 86 and 87 are closed. The inlet and outlet valves on the particular one of the trap assemblies in use should be open and those on the other trap assemblies are closed. Assembly 30 will be considered in use for the instant explanation.

To conserve liquid helium, the freeze-out unit 40, 41, in service, is precooled with liquid nitrogen and then is surrounded with the Dewar flask 36, containing liquid helium. Readings of the volumetric meter 76, and the barometer are noted, and valve 13 is opened slightly to enter a flow of sample gas through the inlet lines 11, and 22, and into the selected trap assembly 30. At this point, gage 17 should indicate about 10 inches vacuum. If the pressure is much higher than this, erratic flow occurs. If a constant pressure is maintained, the flow will be constant through the fixed orifice 81. The Pirani gages 18 and 75, may be turned off during the gas flow.

After one-quarter to one-half cubic foot of gas has passed through the system as shown by the meter 76, inlet valve 13 is closed. It should take approximately 8 minutes to pass the sample through the apparatus. Faster flow rates may result in incomplete freeze-out of impurities. Having passed the sample through the apparatus, Pirani gage 18 is turned on and the system is evacuated to 1.0 mm. Then after opening valve 87, the system is pumped down to less than 0.1 mm. pressure. Valve 86 is next opened to allow a complete pumpout of the helium from the trap assembly 30, and the lines providing paths for gas flow from valve 13.

When the pressure has fallen to 1.0 micron or less, both trap valves 34 and 35 are closed, and the volume of helium passed through the trap assembly 30, is read on the meter 76. As noted hereinbefore, the freeze-out unit 40, 41, is then warmed to room temperature during a sufficient time (at least 30 minutes), to allow the gases therein to warm and become uniformly mixed before they are analyzed. An analysis of the contents of the trap elements is accomplished in the mass spectrometer, and the percentages of the various constituent impurities is determined by calculation, all in the manner previously explained.

While a preferred embodiment of the invention has been illustrated and described herein, it is to be understood that the invention is not limited thereby, but is susceptible of chages in form and detail.

We claim:

1. A method for determining characteristics of the constituent impurities of a high purity helium gas sample, the steps of passing the sample during a predetermined period of time as a measured volume of helium gas maintained at a pressure of a partial vacuum, through the inside of an enclosure vessel having a relatively small predetermined volume and to the outside of which liquid helium maintained at atmospheric pressure was applied to surround the vessel during the aforesaid period of time and for a time period thereafter during which the step of lowering the pressure in the vessel to a near vacuum is effected by evacuating helium gas from the vessel and measuring the volume of the gas evacuated, and the further steps of sealing the vessel to isolate the contents remaining therein, removing the liquid helium from the outside of said vessel and heating the vessel slowly to ambient temperature, and thereafter opening the vessel to remove the total contents therefrom to a mass spectrometer wherein the pressure in the vessel is measured, and the constituent components of the contents are identified and related to each other in accordance with their mole-percent of the total contents.

2. The method of claim 1, whereby the total impurity of the helium gas sample in parts per million is determined from the relationship $$10^6 \left[ \frac{P_t V_e - P_t V_t \text{He}_t}{P_{\text{Ae}} V_{\text{He}}} \right]$$

wherein $P_t$ is the pressure in the enclosure vessel measured in the mass spectrometer, $V_t$ is the predetermined volume of the vessel, $\text{He}_t$ is the fraction of residual helium determined in the mass spectrometer as a constituent component of the total contents of the vessel, $P_{\text{He}}$ is the pressure of the helium leaving the vessel at wet-test meter conditions and is equal to the barometric pressure at that time, and $V_{\text{He}}$ is the measured volume of helium gas passed through the vessel plus the volume of the helium gas subsequently evacuated to obtain a near vacuum in the vessel, and each impurity constituent component in parts per million is determined by multiplying the total impurity in parts per million by the ratio of the mole-percent of a respective impurity constituent component to the total of the mole-percents of all the impurity constituent components as determined in the mass spectrometer.

3. An analyzing apparatus for concentrating and separating impurities from a sample of high purity helium gas comprising a storage enclosure means having maintained within it a pressure of a partial vacuum and a temperature of liquid helium at atmospheric pressure, a source of high purity helium supplying the sample for analysis, a plurality of valve means operable as controlled gas flow conduits, an arrangement of additional gas flow conduits including means indicating the pressure therein, interconnecting the source and the storage means through the gas flow conduits provided by said plurality of valve means, pump means creating said partial vacuum in said storage enclosure and in said gas flow conduits, a further means including means indicating pressure, interconnecting the said arrangement with said pump means, the latter having connected thereto a means indicating the volume of gas exhausted therefrom.

4. The apparatus of claim 3, and said arrangement of gas conduits, also including a conduit having therein a fixed orifice which in cooperation with the variable orifice of one of said plurality of valve means, is operable to maintain within the conduits of said apparatus a steady, and regulated rate of gas flow.

5. An analyzing apparatus for concentrating and separating impurities from a sample of high purity helium gas, comprising at least two storage enclosure means each having as an integral part thereof inlet and outlet conduits, a pump means adapted to maintain within each storage enclosure means a pressure of a partial vacuum, means enveloping each storage enclosure means to maintain therein a temperature of liquid helium at atmospheric pressure, a source of high purity helium for supplying the sample for analysis, an arrangement of interconnected gas transmitting and regulating elements comprising a multiplicity of valve means and a plurality of gas conduits including conduits operatively relating a first plurality and second plurality of said multiplicity of valve means to control a gas flow through the said storage enclosure means which passes from said source to said inlet conduits, and from said outlet conduits to said pump means respectively.

6. The apparatus of claim 5, and said plurailty of gas conduits also including a first conduit having therein a fixed orifice, and a second conduit connected to said source having therein a third plurality of said multiplicity of valve means comprising one valve having a variable orifice which in cooperation with said fixed orifice is operable to maintain within the plurality of gas conduits of said apparatus a steady and regulated rate of gas flow.

7. The apparatus of claim 6, and said plurality of gas conduits also including a third conduit having therein a fourth plurality of said multiplicity of valve means including first and second valves operable to by-pass the control of said first plurality and second plurality of said multiplicity of valve means, and said fixed orifice, respectively.

8. An analyzing apparatus for concentrating and separating impurities from a sample of high purity helium gas, comprising at least two storage enclosure means each having as an integral part thereof inlet and outlet conduits, a pump means adapted to maintain within each storage enclosure means a pressure of a partial vacuum, means enveloping each storage enclosure means to maintain therein a temperature of liquid helium at atmospheric pressure, a source of high purity helium for supplying the sample for analysis, an arrangement of interconnected gas transmitting and regulating elements comprising a multiplicity of valve means and a plurality of gas conduits including conduits operatively relating a first plurality and second plurality of said multiplicity of valve means to control a gas flow through the said storage enclosure means which passes from said source to said inlet conduits, and from said outlet conduits to said pump means, respectively, said plurality of gas conduits including a first conduit having operative therein a fixed orifice, and a second conduit connected to said source having therein a third plurality of said multiplicity of valve means comprising one valve having a variable orifice which in cooperation with said fixed orifice is operable to maintain within the plurality of gas conduits of said apparatus a steady and regulated rate of gas flow, said plurality of gas conduits including a third conduit having therein a fourth plurality of said multiplicity of valve means including first and second valves operable to by-pass the control of said first plurality and second plurality of said multiplicity of valve means, and said fixed orifice, respectively, and said plurality of gas conduits also including a fourth conduit having connected therein a pressure indicator and a cold trap cooperating with a further valve of said multiplicity of valve means operable to control the flow of gas from either said fixed orifice or said second valve of said fourth plurality of valve means, through said pressure indicator and cold trap to said pump means.

9. The apparatus of claim 8, and said plurality of gas conduits also including a further conduit interconnecting said first plurality of said multiplicity of valves and said second valve of said fourth plurality of said multiplicity of valve means with said one valve of said third plurality of said multiplicity of valve means, said a still further conduit having connected therein pressure indicators, and an exhaust line extending from said pump means having connected therein a meter indicating the volume of gas being pumped from said apparatus.

10. In an analyzing apparatus for separating impurities from a sample of high purity helium gas, a cold trap adapted for use at temperatures as low as —452° F. wherein impurities from the helium gas sample are concentrated by freezing them, comprising inlet and outlet valves and further elements of corrosion-resistant metal including, a coil of hollow tubing having one end connected to the inlet valve, a length of hollowing tubing having one end connected to the outlet valve, an enclosure vessel having separate openings therein to receive the respective other ends of the coil and length of hollow tubing.

11. In the analyzing apparatus of claim 10, the cold trap having the length of tubing passing centrally through the coil of hollow tubing.

12. In the analyzing apparatus of claim 10, the cold trap having an enclosure vessel comprising a hollow cylindrical body part having an orifice means at one end to receive through it the other end of the length of hollow tubing, and an opening in its cylindrical wall to receive through it the other end of the coil of hollow tubing, and a cap part secured to the end of the body part opposite the orifice means.

References Cited by the Examiner
UNITED STATES PATENTS 1,845,247   2/32   Davidson _____ 62—42

OTHER REFERENCES

Article by Duswalt and Brandt, published in Analytical Chemistry, vol. 32, Number 2, Feb. 1960, pp. 272–274.

Article by Mosen and Buzzelli; published in Analytical Chemistry, vol. 32, Number 1, Jan. 1960, pp. 141–142.

RICHARD C. QUEISSER, *Primary Examiner.*

ROBERT L. EVANS, JOSEPH P. STRIZAK, *Examiners.*